Patented Apr. 27, 1937

2,078,537

UNITED STATES PATENT OFFICE 2,078,537

PRESERVATION OF GREEN-FODDER

Friedrich August Henglein, Cologne-Deutz, and Friedrich Wilhelm Stauf, Leverkusen-Wiesdorf, Germany, assignors to I. G. Farbenindustrie Aktiengesellschaft, Frankfort-on-the-Main, Germany No Drawing. Application December 23, 1932, Serial No. 648,722. In Germany January 22, 1932

4 Claims. (Cl. 99—8)

This invention relates to the preservation of green-fodder, more particularly it relates to the preservation of green-fodder by the addition of an acidic substance.

It is known that green-fodder can be preserved by the addition of acids, for instance, formic acid, hydrochloric acid and phosphoric acid; however, for the application of the process on a large scale the price of the acid is decisive. The cheapest of the acids coming into consideration—the hydrochloric acid—can only be shipped in an about 30% aqueous solution and has to be packed in carboys, whereby great expenses caused by breakage, loss, cost of freight, etc. occur. It has therefore been the desire of the consumers to have a compound which could be shipped without being packed in expensive packing material, for instance, carboys, and which would yield the desired preservation means in a convenient manner.

In accordance with the present invention it has been found that suitable preserving agents are the oxides and chlorides of phosphorus; phosphorus pentoxide and phosphorus trioxide, phosphorus oxychloride, phosphorus trichloride and phosphorus pentachloride are equally well suitable for this purpose. Thus, for instance, the phosphorus pentachloride dissociates on dissolving in water so that upon one mol. of pentachloride one mol. of phosphoric acid and 5 mols of hydrochloric acid are formed. The preserving effect is brought about by the amount of H-ions present. The effect of 1000 kgs. of 30% hydrochloric acid corresponds to about 220 kgs. of phosphorus pentachloride.

A further advantage of the phosphoric acid and hydrochloric acid-phosphoric acid mixtures is that by the addition of phosphoric acid to the fodder the nutritive value of the fodder is increased, and, as part of the phosphorus reappears as dung, the fertilizing value of dung is also increased.

Further, it has been found that the presence of phosphoric acid in the green-fodder catalytically influences the formation of lactic acid.

Another advantage is that the phosphorus oxides and chlorides can easily and inexpensively be stored, which is not the case with hydrochloric acid which, on account of its great volume and the special tanking stations it requires, causes considerable storing costs. This is of importance, since preserving agents naturally can only be applied during the summer months.

On dissolving phosphorus oxides or chlorides in water or aqueous solutions phosphoric acid and phosphoric acid-hydrochloric acid mixtures respectively are formed. This process, however, is very dangerous on account of the violent reaction taking place. When packing these substances in closed containers they can very conveniently and safely be dissolved. Thereby also a very convenient dosing is attained. The packing of phosphorus chlorides, on account of the great chemical reactivity of this material is connected with difficulties, especially as far as the closing of the containers filled with these substances is concerned.

According to the feature of the invention the phosphorus chlorides or oxides are conveniently packed in metallic containers, the bottoms or covers of which are either folded, welded or soldered. The welding may be performed electrically.

As packing material not only sheet copper and leaded sheet iron have proved suitable but also ordinary sheet iron, for instance, tin plate and black plate may find application, provided, that the cover of the container is tightly closed, for instance, by welding or folding. Such closure is tight against moisture and air and can be made especially tight when working into the folding during this process for instance lead, caoutchouc, asphalt, etc. The means for tightening can also be attained by squirting upon the rim of the cover or bottom or also by applying massive packing rings. The content of the container is dissolved by placing it into water after it has been punctured at different places shortly before use. Preferably the container is weighted so that it remains on the bottom of the reservoir.

On dissolving phosphorus pentachloride in water or aqueous solutions a very strong decomposition and violent formation of hydrochloric acid take place causing great inconvenience, because the powder on account of its small shaking weight stays on the water surface and is kept in suspension on account of the formation of gas.

According to another feature of the invention it has been found that phosphorus pentachloride can readily be dissolved in water when pressing the pulverized substance for instance in a cylindrical form. The shaking weight is thereby considerably increased and after pressing amounts to 1.0 and even attains 2.0. The pentachloride in the pressed form sinks immediately when brought into water or aqueous solutions. The gases forming are immediately adsorbed from the water.

According to a further feature of the invention also formic acid salts, for instance, sodium formate, potassium formate, etc., and the oxides or chlorides of phosphorus, for instance, phosphorus trioxide, phosphorus pentoxide, phosphorus tri-, oxy-and pentachloride are simultaneously employed for the preservation of green-fodder. Thereby it becomes possible to produce preservation acids of each desired concentration as well as mixtures of phosphoric acid with another acid, for instance, formic acid and hydrochloric acid mixtures of each proportion. Thus, for example, on dissolving one mol. of phosphorus pentachloride in water 5 mols of hydrochloric acid and one mol. of phosphoric acid are formed, by which formic acid can be produced from the corresponding quantity of formic acid salts.

Another feature of the invention is that a mixture of phosphorus chlorides and chlorosulfonic acid salts can be prepared which reacts with water with the formation of hydrochloric acid, sulfuric acid and phosphoric acid. This mixture can readily be packed in containers which are punctured before use and then brought into water. In order to avoid the floating of the containers on the surface of the water they are weighted by means of metals, stones, etc.

The invention is further illustrated by the following examples without being restricted thereto:

*Example 1.*—10 kgs. of phosphorus pentachloride are pressed in a cylindrical form by means of a hydraulic press. The pressed phosphorus pentachloride is packed into a 5 liter container of black plate, which container is electrically welded. The solution of the phosphorus pentachloride takes place in such a manner that the container provided with an iron weight is punctured by means of a nail at various places and is brought into a barrel containing 200 liters of water. Immediately after dipping the container into the water the decomposition of the phosphorus pentachloride begins with a vigorous buzzing noise. After a few minutes the noise ceases thus indicating that the decomposition is performed. The container and the weight are taken out of the water, the weight is dried and kept for further weighting purposes. The acid solution thus formed containing in one liter 43.9 grams of hydrochloric acid and 23.5 grams of phosphoric acid is sprayed on to each layer of the tightly packed fodder.

*Example 2.*—208 parts by weight of phosphorus pentachloride and 138 parts by weight of the sodium salt of chlorosulfonic acid are intimately mixed and packed in a container. The closed container is punctured and brought into 10000 parts by weight of water. An acid solution containing in one liter 21.9 grams of hydrochloric acid, 4.9 grams of sulfuric acid and 9.8 grams of phosphoric acid is thus obtained.

*Example 3.*—4.16 parts by weight of phosphorus pentachloride and 1.10 parts by weight of the sodium salt of pyrochlorosulfonic acid are intimately mixed and packed in a container. The container which is weighted is provided with punctures and brought into 100 parts by weight of water. After the solution is complete an acid solution containing in one liter 38.3 grams of hydrochloric acid, 7.4 grams of sulfuric acid and 19.6 grams of phosphoric acid is thus obtained.

*Example 4.*—A welded sheet iron container containing 5 kgs. of phosphorus trichloride, is punctured at four places by means of a nail and weighted and then brought into 100 liters of water. The decomposition of the phosphorus trichloride with the water takes place with absolute safety and without rising of the gases to the surface of the water. After about 5 minutes the content of the container is completely dissolved and an acid solution is formed which contains in one liter 39.8 grams of hydrochloric acid and 35.6 grams of phosphoric acid.

*Example 5.*—For preserving green-fodder each layer of the fodder is strewed with calcium formate and sprayed with the solution prepared in accordance with the directions given in Example 1.

*Example 6.*—4500 kgs. of meadow grass which has been brought into a painted acid-proof cement silo is sprayed with the acid solution obtained in accordance with the directions given in Example 1. The fodder is well trodden so that the air which is bad for the preservation is removed as much as possible. After the silo has been filled the upper layer is covered with a little more of the acid solution and the fodder is well covered with loamy earth. After eight weeks a test is taken displaying a pH value of 3.8, and the mass contains 1.4% of lactic acid, 0.3% of acetic acid and no butyric acid. The loss of nutritive substances amounts to about 8%, whereas in the case of a good hay crop this loss amounts to at least 30%. The fodder thus preserved can be fed as high grade green-fodder.

We claim:—

1. In the process of preserving green-fodder the step which comprises treating the green-fodder with the solution obtained by decomposing phosphorus pentachloride with water.

2. A process of preserving green-fodder which comprises treating the green-fodder with an aqueous solution obtained by reacting with water upon a preparation comprising as an active ingredient a phosphorus chloride.

3. A process of preserving green-fodder which comprises treating the green-fodder with an aqueous solution obtained by reacting with water upon a preparation comprising as active ingredients a phosphorus chloride and a formate.

4. A process of preserving green-fodder which comprises treating the green-fodder with an aqueous solution obtained by reacting with water upon a preparation comprising as active ingredients a phosphorus chloride and a chlorosulfonate.

FRIEDRICH AUGUST HENGLEIN.
FRIEDRICH WILHELM STAUF.